(12) United States Patent
Kusaka

(10) Patent No.: US 6,201,617 B1
(45) Date of Patent: Mar. 13, 2001

(54) IMAGE SENSING DEVICE

(75) Inventor: Yasushi Kusaka, Osaka (JP)

(73) Assignee: Minolta Co., Ltd., Osaka (JP)

( * ) Notice: Subject to any disclaimer, the term of this patent is extended or adjusted under 35 U.S.C. 154(b) by 816 days.

(21) Appl. No.: 08/506,804

(22) Filed: Jul. 25, 1995

(30) Foreign Application Priority Data

Jul. 26, 1994 (JP) .................................................. 6-174324

(51) Int. Cl.$^7$ .................................................. H04N 1/04
(52) U.S. Cl. .......................................... 358/482; 348/297
(58) Field of Search .................................. 358/482, 483, 358/445; 382/312; 348/262, 264, 266, 282, 294, 297, 298, 307, 308; 250/208.1, 214 AG; 357/30; 377/60

(56) References Cited

U.S. PATENT DOCUMENTS

| | | | |
|---|---|---|---|
| 4,216,503 | * 8/1980 | Wiggins | 358/280 |
| 4,734,762 | 3/1988 | Aoki et al. | 358/80 |
| 4,945,405 | 7/1990 | Hirota | 358/75 |
| 5,003,565 | * 3/1991 | Yoshida | 377/60 |
| 5,138,149 | * 8/1992 | Cadet | 250/214 AG |
| 5,241,575 | * 8/1993 | Miyatake et al. | 377/60 |
| 5,267,053 | * 11/1993 | Potucek | 358/446 |
| 5,408,335 | * 4/1995 | Takahashi | 358/431 |

FOREIGN PATENT DOCUMENTS

| | | |
|---|---|---|
| 0213867 B1 | 6/1912 | (EP) . |
| 59-72870 | 4/1984 | (JP) . |

OTHER PUBLICATIONS

Microelectronics; Millman & Grabel; 1987; p. 69.*

* cited by examiner

*Primary Examiner*—Jerome Grant, II

(57) ABSTRACT

An image sensing device includes three photoelectric signal generators, each of which generates a photoelectric signal proportional to an intensity of incident light, and three converters which are connected with the photoelectric current generators, respectively. Each of the converters generates an analog signal which is logarithmically proportional to the photoelectric signal. A direct-current component of the analog signal, generated by each of the converters, is adjusted to perform a white balance adjustment before an A/D conversion.

25 Claims, 7 Drawing Sheets

IMAGE SENSING DEVICE

BACKGROUND OF THE INVENTION

1. Field of the Invention

The present invention relates to an image sensing device for converting optical signals to electrical signals, and specifically relates to an image sensing device which logarithmically converts a photoelectric current generated in accordance with the intensity of incident light for output.

2. Description of the Related Art

Color image sensing devices are provided with red, green, and blue filters, through which passes light which impinges photoreceptor sensors of red (R), green (G), and blue (B). However, these filters have different transmittance, e.g., the amount of light transmitted by each filter is different in the case of achromatic color. Specifically, the transmittance of red color is greatest, followed by green, then blue in that order. Accordingly, white balance adjustment is performed to correct differences in the amount of said transmitted light.

When sensors having linear characteristics output linear photoelectric current in accordance with the intensity of incident light, differences in the amount of light impinging the R, G, and B photoreceptors produce input/output (I/O) characteristics as shown in FIG. 1(a) (wherein the horizontal axis represents the linear scale). In the case of sensors having linear characteristics, adjustments are made to the gain of the amplification circuits connected to the output side of the sensors, so as to match R, G, B characteristics and correct white balance by changing the slope of the I/O characteristics (refer to U.S. Pat. No. 4,734,762).

On the other hand, U.S. Pat. No. 5,241,575 discloses an image sensing device provided with sensors which logarithmically convert a photoelectric current generated in accordance with the intensity of incident light. When the intensities of the incident light impinging the R, G, and B photoreceptors of this image sensing device are different, the I/O characteristics of these sensors are as shown in FIG. 1(b) (wherein the horizontal axis represents the logarithm scale). In the case of an image sensing device of this logarithm conversion type, adjustments of the gain of the amplification circuits cannot accomplish matching of the R, G, B characteristics. Accordingly, white balance adjustment is accomplished after analog-to-digital (A/D) conversion of the sensor output signals. Thus, in conventional image sensing devices of the logarithm conversion type, there are differences in the output levels of R, G, and B sensors, such that n bits less than the number of bits of A/D conversion are allocated as gradient numbers relative to amplitude A of an image signal.

SUMMARY OF THE INVENTION

An object of the present invention is to provide an image sensing device having logarithm conversion functions, which is capable of achieving white balancing using a simple construction.

A further object of the present invention is to provide an image sensing device capable of a greater number of gradients.

These and other objects, advantages and features of the invention will become apparent from the following description thereof taken in conjunction with the accompanying drawings which illustrate a specific embodiment of the invention.

BRIEF DESCRIPTION OF THE DRAWINGS

In the following description, like parts are designated by like reference numbers throughout the several drawings.

DETAILED DESCRIPTION OF THE PREFERRED EMBODIMENTS

The preferred embodiments of the present invention are described hereinafter with reference to the accompanying drawings.

First Embodiment

Figure 4:
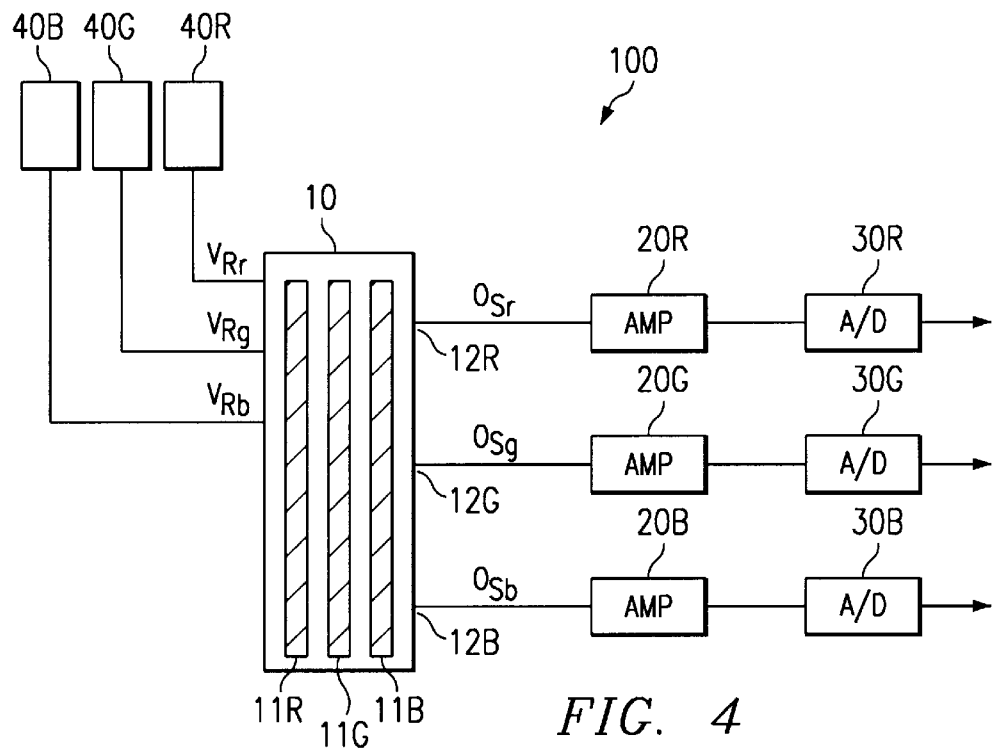
FIG. 4 shows the general construction of a first embodiment of the image sensing device of the present invention.

FIG. 4 shows the general construction of an image sensing device of the present invention. Image sensing device 100 is provided with solid state image sensing section 10, amplification circuits 20R, 20G, 20B for amplifying the outputs from said solid state image sensing section 10, A/D converters 30R, 30G, 30B for converting the outputs from said amplification circuits 20R, 20G, 20B as digital signals, and voltage generating circuits 40R, 40G, 40B connected to said solid state image sensing section 10. Solid state image sensing section 10 is provided with three rows of image sensing/transfer sections corresponding to the colors red (R), green (G), blue (B). The rows of each color of the image sensing/transfer section 10 include a plurality of image sensing/transfer elements arranged in a linear array. The drawing shows rows of photoreceptor elements 11R, 11G, 11B of the image sensing/transfer section of each color. Furthermore, photoreceptors 11R, 11G, 11B are provided with a red filter, a green filter, and a blue filter, respectively Voltage generating circuits 40R, 40G, 40B correspond to R, G, B, and supply reference voltages $V_{Rr}$, $V_{Rg}$, $V_{Rb}$ to solid state image sensing section 10.

The R, G, B output signals $O_{Sr}$, $O_{Sg}$, $O_{Sb}$ from solid state image sensing section 10 are outputted from output pins 12R, 12G, 12B. After these signals are amplified by amplification circuits 20R, 20G, 20B, they are converted to digital signals by A/D converters 30R, 30G, 30B.

Figure 5:
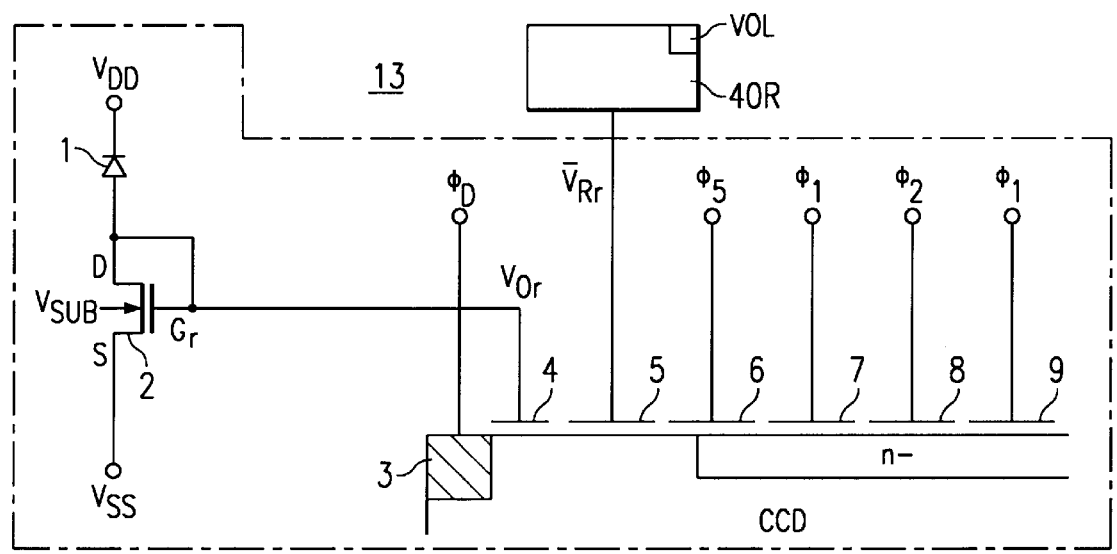
FIG. 5 shows the circuit construction of the image sensing/transfer section within the solid state imaging portion.

FIG. 5 shows an image sensing/transfer section 13 within solid state image sensing section 10 of FIG. 4. The drawing shows only one image sensing/transfer section 13 in the construction corresponding to red (R) solid state image sensing section 10. Other image sensing/transfer sections in array R as well as image sensing/transfer sections in arrays G and B have identical constructions to that shown in FIG. 5.

Image sensing/transfer section 13 comprises PN-junction photodiode 1, n-channel MOS-FET (metal-oxide semiconductor field-effect transistor) 2, and a charge-transfer CCD. Photodiode 1 is a photoelectric signal generator which is sensitive to an incident light and generates a photoelectric signal which is logarithmically proportional to an intensity of that incident light. Cathode of photodiode 1 is supplied with a voltage $V_{DD}$, and the anode of the photodiode 1 is connected to the drain D and the gate G of MOS-FET 2. Source S of MOS-FET 2 is supplied with a voltage $V_{SS}$, and the backgate (substrate) of the MOS-FET 2 is applied a voltage $V_{SUB}$. The relationship of these bias voltages is $V_{DD} > V_{SS} \geq V_{SUB}$, an opposite bias is applied to photodiode 1, an opposite bias relative to MOS-FET 2 is applied to the substrate, and an opposite bias relative to the drain is applied to the substrate. Voltage $V_{SUB}$ applied to the backgate (substrate) of MOS-FET 2 is regulated such that a subthreshold current flows to MOS-FET 2. Therefore, the MOS-FET 2 operates in the subthreshold region, such that the drain current of MOS-FET 2 is an exponential function of the voltage between the gate and source. Thus, MOST-FET 2 is a convert which is connected to the photodiode 1 so as to generate a first analog signal which is a logarithmic function of the photoelectrical signal generated by photodiode 1.

Gate of the aforesaid MOS-FET 2 is connected to the first electrode 4 of the charge-transfer CCD. The second electrode 5 of the charge-transfer CCD is connected to the voltage generating circuit 40R, and the second electrode 5 is supplied a reference voltage $V_{Rr}$ from the voltage generating circuit 40R. Voltage generating circuit 40R is provided with a volume control VOL for manually adjusting the voltage $V_{Rr}$ supplied to second electrode 5 of the charge-transfer CCD. Volume control VOL may be, for example, a sliding resistor, but is not limited thereto. Voltage generating circuit 40R may be commonly provided to image sensing/transfer sections 13 of the array of each color, or may be independently provided to each image sensing/transfer section 13 of the array of each color.

In the image sensing/transfer section 13 of the aforesaid construction, a photoelectric current proportional to the intensity of the light impinging photodiode 1 flows from the cathode to the anode. Since voltage $V_{SUB}$ is regulated so that a subthreshold current flows to MOS-FET 2, the photoelectric current is subjected to logarithm conversion to produce voltage $V_G$ which is applied to first electrode 4 of the charge-transfer CCD.

Thus, the first electrode 4 of the charge-transfer CCD is supplied with the gate voltage $V_G$ of the log conversion MOS-FET 2, the second electrode 5 of the charge-transfer CCD is supplied with the reference voltage $V_{Rr}$, and a signal charge is injected into the charge-transfer CCD which corresponds to the difference in the lower limit channel potential of both electrodes.

Figure 6:
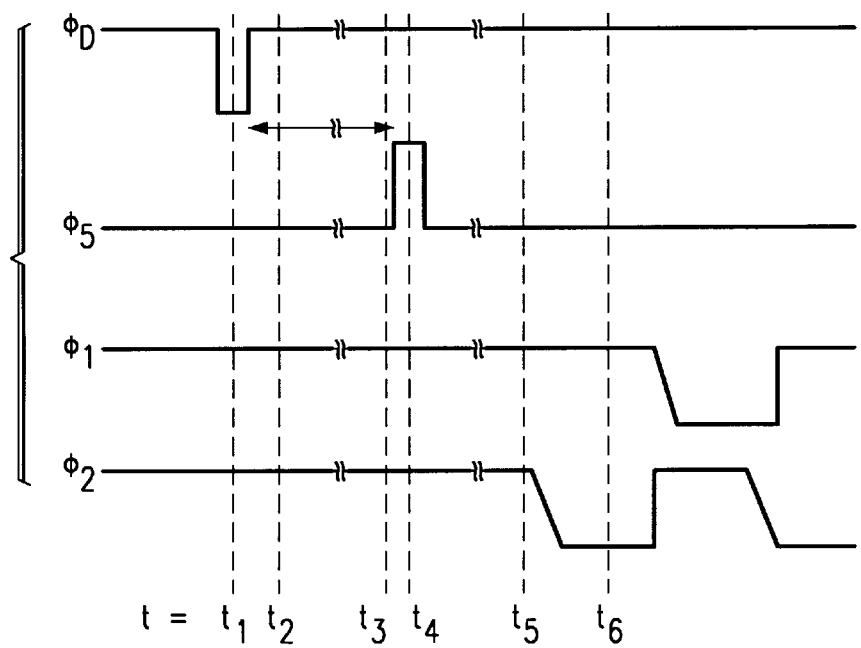
FIG. 6 is a timing chart of clock signals for driving the charge-coupled device (CCD) of the charge transfer section.

A pulse $\phi D$ is applied to input diode 3 of the charge-transfer CCD, pulse $\phi S$ is applied to third electrode 6, pulse $\phi 1$ is applied to fourth electrode 7, and pulse $\phi 2$ is applied to fifth electrode 8 (refer to FIG. 6). Pulses $\phi 1$ and $\phi 2$ are sequentially applied to electrodes subsequent to sixth electrode 9, so as to transfer the charge in a two-phase actuation.

Figure 7:
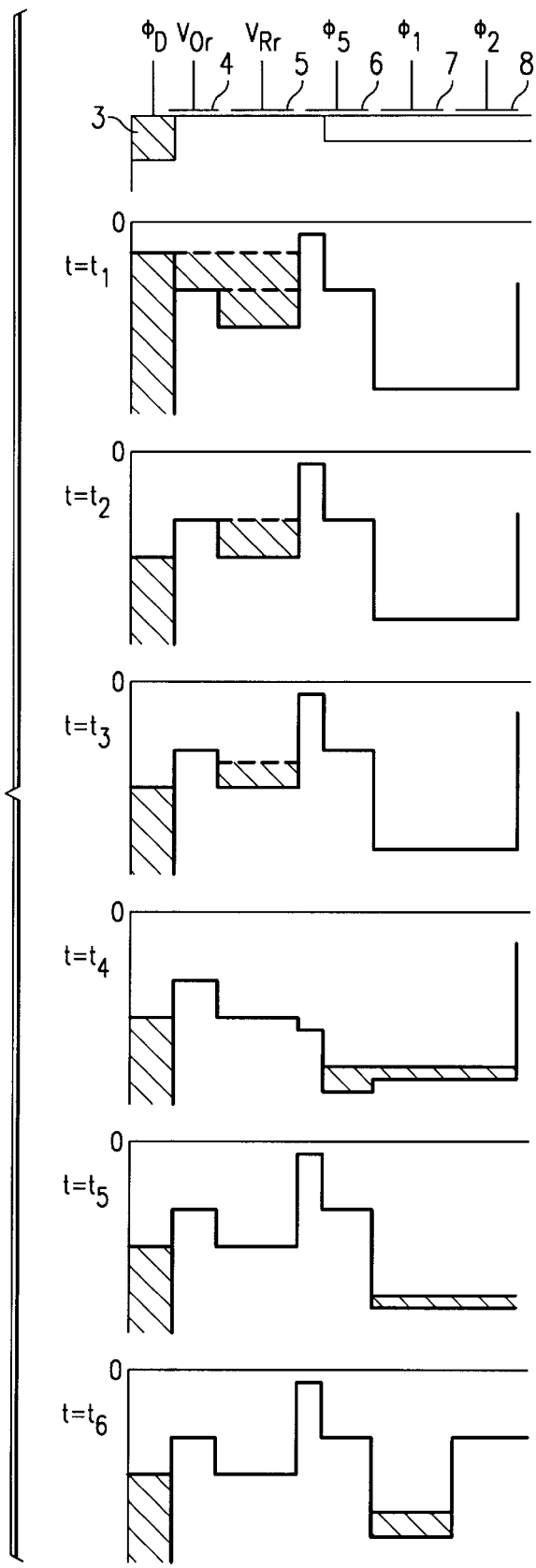
FIG. 7 is a conceptual representation of the operating principle of the charge-transfer CCD.

FIG. 7 illustrates the channel potential corresponding to the time chart of drive pulses of FIG. 6. The areas of the drawing shaded by diagonal lines indicate portions where a charge is present.

At time t=t1, when clock pulse $\phi D$ applied to input diode 3 of the charge-transfer CCD is changed from high (H) level to low (L) level, the charge passes through first electrode 4 and is injected below second electrode 5. At time t=t2, when a clock pulse $\phi D$ is changed to high (H) level, the excess charge is returned to input diode 3. These actions are equivalent to a reset operation, and the charge accumulation corresponds to the difference between reference voltage $V_{Rr}$ and the gate voltage $V_G$ of second electrode 5. Thereafter, a part of the charge of second electrode 5 passes through first electrode 4 and is emitted to input diode 3 to accomplish an integral control action.

At time t=t3, after the integral time (the time indicated by the arrow in the time chart of FIG. 6) has ended, the pulse $\phi D$ changes to high (H) level at time t=t4, and the channel potential of third electrode 6 falls, such that the stored charge flows to fourth electrode 7 and fifth electrode 8 used as shift registers. The offset charge amount transferred to the shift registers is determined by the reference voltage $V_{Rr}$ applied to second electrode 5, such that the direct-current (DC) component of the output signal can be regulated by adjusting said voltage $V_{Rr}$. Thus, the charge-transfer CCD and the voltage generating circuit 40R constitute a signal adjusting device for adjusting a direct current component of the first analog signal, outputted by the MOST-FET 2, and for outputting a second analog output signal which has the thus regulator direct-current component.

Then, after time t=t5 has elapsed, when the signal to the $\phi 2$ register (i.e., the register activated by pulse $\phi 2$) changes form high (H) level to low (L) level, the channel potential of the $\phi 2$ register rises, and the charge is collected in the $\phi 1$ register (i.e., the register activated by pulse $\phi 1$) (t=t6). Thereafter, pulse $\phi 1$ changes form high (H) level to low (L) level, and pulse $\phi 2$ changes from low (L) level to high (H) level, such that the charge is transferred to the $\phi 2$ register. The charge is thus transferred to adjacent registers by inputting a reverse phase clock pulse to the $\phi 1$ and $\phi 2$ registers from the aforesaid state.

Figure 1A:
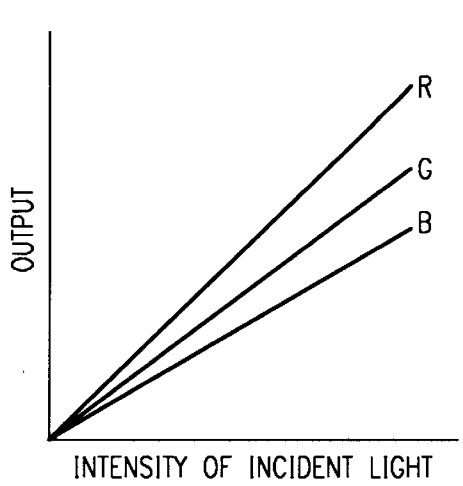
FIG. 1(a) shows the I/O characteristics of an image sensing device having sensors with linear characteristics when white balance correction is not accomplished.
Figure 1B:
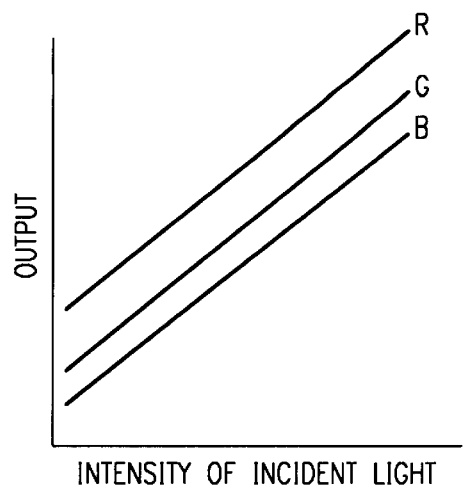
FIG. 1(b) shows the I/O characteristics of an image sensing device having sensors of a logarithm conversion type when white balance correction is not accomplished.
Figure 2:
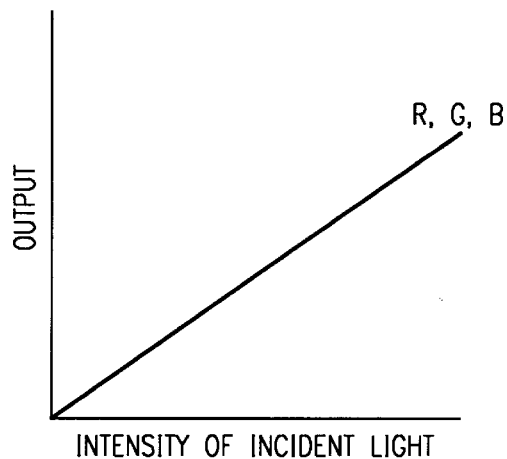
FIG. 2 shows the I/O characteristics of an image sensing device when white balance correction is accomplished.
Figure 3:
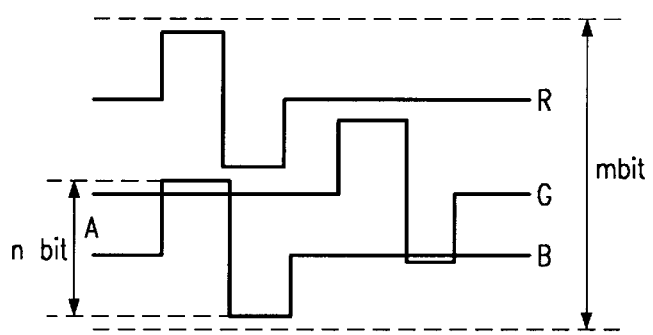
FIG. 3 is an illustration showing the relationship between image signals and the number of bits of A/D conversion in the prior art.

Reference voltages $V_{Rr}$, $V_{Rg}$, and $V_{Rb}$ applied to second electrode 5 of the charge-transfer CCD corresponding to each color participate in the DC component of the output of image sensing/transfer section 13, and, therefore, the output characteristics of FIG. 1(b) can be matched by adjusting the volume control VOL of said reference voltages $V_{Rr}$, $V_{Rg}$, and $V_{Rb}$. Changing the DC components of the output of the charge-transfer CCD means a horizontal migration without changing the slope of said R, G, B characteristics in FIG. 1(b). Accordingly, in the present embodiment, white balance correction can be accomplished by managing the levels of the output signals $O_{Sr}$, $O_{Sg}$, $O_{Sb}$ outputted from solid state image sensing section 10.

Figure 8:
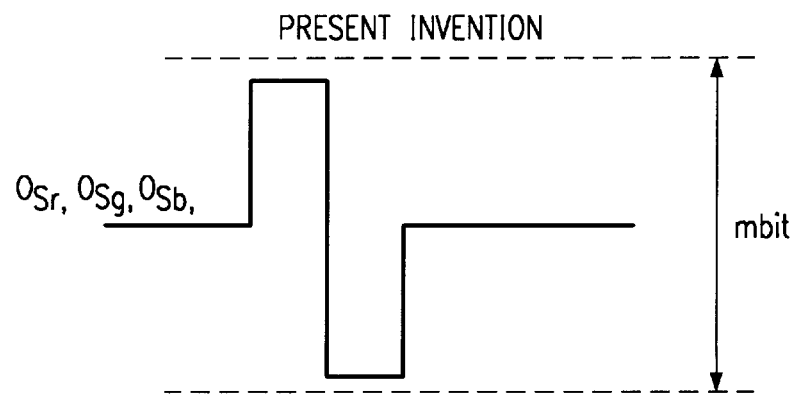
FIG. 8 shows the relationship between image signals and the m bit of the A/D converter of the present invention.

Output signals $O_{Sr}$, $O_{Sg}$, $O_{Sb}$, the levels of which have been managed as described above, are amplified by amplifiers 20R, 20G, 20B, and then, inputted to A/D converters 30R, 30G, 30B. Thus, each A/D convert 30R, 30G, 30B, which is connected via the respective amplifier 20R, 20G, 20B to the respective signal adjusting device (combination of a charge-transfer CCD and a voltage generating circuit 40), generates a digital signal based on the analog output signal generated by the respective signal adjusting device. Therefore, the bit number m of said A/D converters 30R, 30G, 30B can be equivalent to the number of gradients, as shown in FIG. 8.

Figure 9:
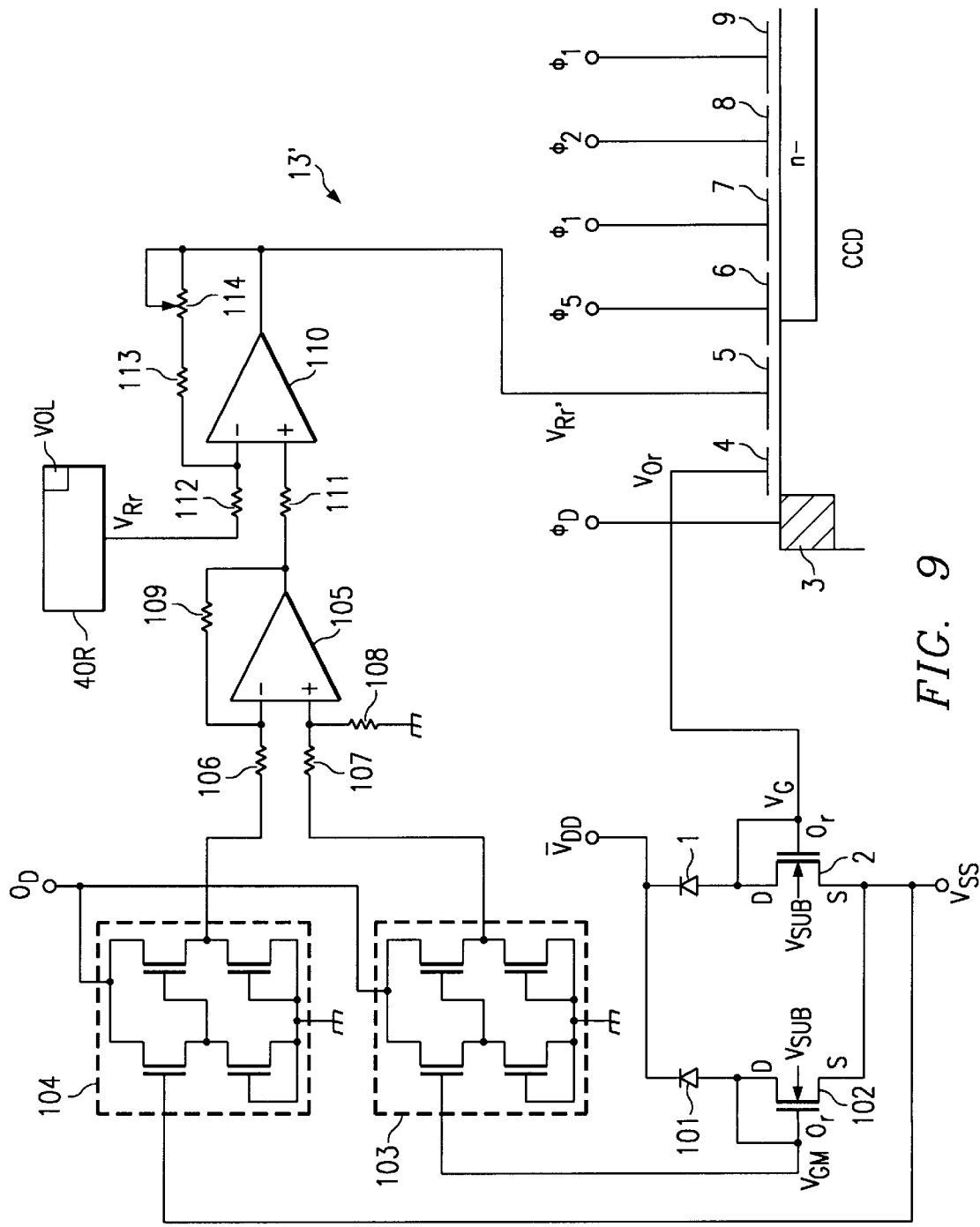
FIG. 9 shows a modification of the circuit construction of the image sensing/transfer section of FIG. 5.

FIG. 9 shows the construction of modification 13' of image sensing/transfer section 13 of FIG. 5. Like parts of the image sensing/transfer section 13 and 13' are designated by like reference numbers relative to FIGS. 5 and 9, and are therefore omitted from the following discussion.

In image sensing-transfer section 13', photodiode 101 is provided to monitor the amount of light impinging the photoreceptor section. The cathode of photodiode 101 is supplied a bias voltage $V_{DD}$, and the anode is connected to the gate and drain of MOS-FET 102. The bias voltage applied to said MOS-FET 102 is identical to that applied to MOS-FET 2. The voltage between the drain current of MOS-FET 102 is an exponential function of the voltage between the gate and source. The gate of MOS-FET 102 is connected to the input pin of source follower AMP 103, and the source voltage Vss of MOS-FET 2 and 102 is connected to the input pin of source follower AMP 104.

Source follower AMPs 103 and 104 have mutually identical constructions comprising four combined MOS-FETs. The output of source follower AMP 104 is connected via resistor 106 to the inverse input pin of differential amplifier 105. The output of source follower AMP 103 is connected via resistor 107 to the noninverse input pin of said differential amplifier 105. The noninverse input pin of differential amplifier 105 is grounded via resistor 108, and the output pin and inverse input pin are connected via resistor 109.

The output pin of differential amplifier 105 is connected to the noninverse input pin of differential amplifier 110 via resistor 111. Voltage regulator 40R is connected via resistor 112 to the inverse input pin of differential amplifier 110. The output pin and inverse input pin of differential amplifier 110 are connected via resistor 113 and variable resistor 114. The output pin of differential amplifier 110 is further connected to second electrode 5 of the charge-transfer CCD, such that the output of said differential amplifier 110 is applied to second electrode 5 as reference voltage $V_{Rr}'$.

In image sensing/transfer section 13' having the aforesaid construction, photodiode 101 monitors the amount of light entering the photoreceptor section, and generates a photoelectric current corresponding to the intensity of the entering light. MOS-FET 102 converts the aforesaid photoelectric current via logarithm conversion and outputs it to source follower AMP 103 as gate voltage $V_{GM}$.

Differential amplifier 105, which receives the inputs of the power source voltage $V_{SS}$ and the outputted signal of photodiode 101 via source follower AMPs 103 and 104, outputs a voltage corresponding to the difference in said inputs to differential amplifier 110. Differential amplifier 105 eliminates the fluctuating portion of power source voltage $V_{SS}$ to achieve high error-free reliability of output $V_{Rr}$.

In differential amplifier 110, the output reference voltage $V_{Rr}'$ is regulated by suitably adjusting the regulating voltage $V_{Rr}$, thereby regulating the DC segment of the output signal output from the charge-transfer CCD. Regulation of voltage $V_{Rr}$ is accomplished by the voltage regulating volume control VOL of the outputted signal output from the charge-transfer CCD.

Second Embodiment

Figure 10:
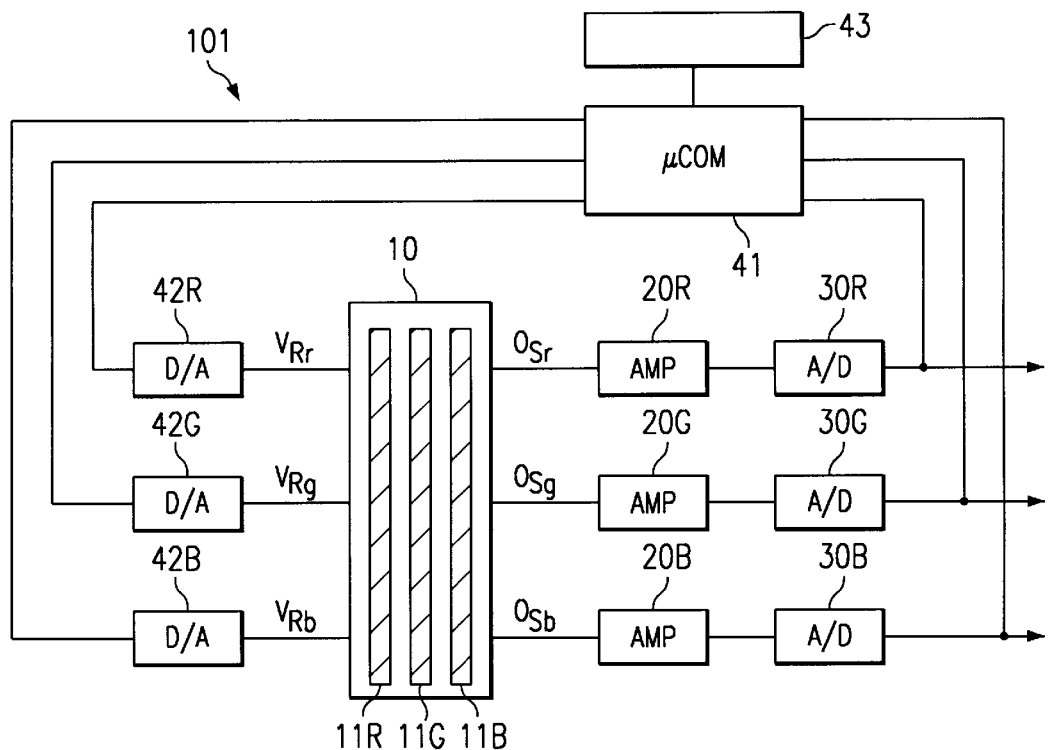
FIG. 10 is a block diagram showing the construction of a second embodiment of the image sensing device of the present invention.

FIG. 10 shows the construction of a second embodiment of the present invention. In image sensing device 101, parts comparable to those of the first embodiment are designated by like reference numbers and are omitted from the present description.

Microcomputer 41 is provided in image sensing device 101 of the present embodiment, and said microcomputer 41 automatically calculates reference voltages $V_{Rr}$, $V_{Rg}$, $V_{Rb}$ which are supplied to second electrode 5 of the charge-transfer CCD (refer to FIG. 5). The input pins of microcomputer 41 are connected to the output pins of each A/D converter 30R, 30G, 30B, and the output pins of microcomputer 41 are connected to D/A converters 42R, 42G, 42B provided for each color R, G, B. These D/A converters 42R, 42G, 42B apply reference voltages $V_{Rr}$, $V_{Rg}$, $V_{Rb}$, corresponding to the output signals outputted from microcomputer 41 to second electrodes 5 of the charge-transfer CCD for each color. Memory 43 connected to microcomputer 41 is a buffer provided as a work area for microcomputer 41. Furthermore, the memory 43 stores initial digital signals to be initially outputted to the D/A converters 42R, 42G, 42B beforehand.

The regulation sequences of reference voltages $V_{Rr}$, $V_{Rg}$, $V_{Rb}$ in the present embodiment are described hereinafter. Microcomputer 41 outputs initial digital signals to D/A converters 42R, 42G, 42B so that D/A converters 42R, 42G, 42B apply the initial reference voltages $V_{Rr}$, $V_{Rg}$, $V_{Rb}$ to the second electrode of the charge-transfer CCD of each color. Achromatic light enters solid state image sensing section 10, and output signals $O_{Sr}$, $O_{Sg}$, $O_{Sb}$ corresponding to said incident light are respectively converted to digital signals by A/D converters 30R, 30G, 30B. Microcomputer 41 fetches the digital signal of each color from the input port, and computes digital signals to be outputted to D/A converters 42R, 42G, 42B based on said digital signals. Microcomputer 41 then outputs these computed digital signals to D/A converters 42R, 42G, 42B. D/A converters 42R, 42G, 42B, which have received the computed digital signals, provide analog voltages corresponding to said signals, and apply said analog voltages to the second electrode of the charge-transfer CCD of each color as reference voltages $V_{Rr}$, $V_{Rg}$, $V_{Rb}$. In image sensing device 101 of the present embodiment, the reference voltages applied to the second electrode of the charge-transfer sections can be automatically regulated. Thus, in this second embodiment, the microcomputer 41, memory 43, D/A converters 42R, 42G, 42B, and the respective charge-transfer CCDs constitute a signal adjusting device for adjusting a direct current component of the first analog signal, outputted by the MOS-FET 2, and for outputting second analog output signals which have the thus regulated direct-current component.

In the construction of the second embodiment, a method is used wherein reference voltages $V_{Rr}$, $V_{Rg}$, $V_{Rb}$, suitable for predetermined types of objects, e.g., objects under fluorescent light, objects under incandescent light and the like, are stored beforehand in memory 43, such that reference voltages $V_{Rr}$, $V_{Rg}$, $V_{Rb}$ corresponding to said types of objects can be readout from memory 43. In this instance, selection switches are connected to microcomputer 41, and reference voltages $V_{Rr}$, $V_{Rg}$, $V_{Rb}$ corresponding to said types of objects are stored beforehand in memory 43 corresponding to said selection switches, respectively. Reference voltages $V_{Rr}$, $V_{Rg}$, $V_{Rb}$ are used in conjunction with selection switch operation during image sensing. Thus, in this method, the microcomputer 41 can receive a digital signal, which was generated by the A/D converter 30R, 30G, 30B when a reference image was exposed to the photoelectric signal generator 1, and can determine an adjustment quantity of the direct-current component of the first analog signal outputted by the respective MOS-FET.

External operation keys for accomplishing micro adjustment of the white balance may be connected to microcomputer 41. In this instance, digital signals outputted to D/A converters 42R, 42G, 42B are changed in accordance with the operation of said external operation keys, and can be used to accomplish micro adjustment of the white balance during image sensing.

As can be readily understood from the aforesaid description, the image sensing device of the present embodiment is a solid state image sensing device of a logarithm conversion type capable of managing signals of each color inputted to A/D converters, wherein the bit number m of the A/D converters is equivalent to the number of gradients.

Third Embodiment

Although the first and second embodiments regulate the DC component of the signals before the charge-transfer in the charge-transfer CCD, it is to be noted that white balance adjustment may be accomplished after charge-transfer, i.e., on the output from the charge-transfer CCD.

Figure 11:
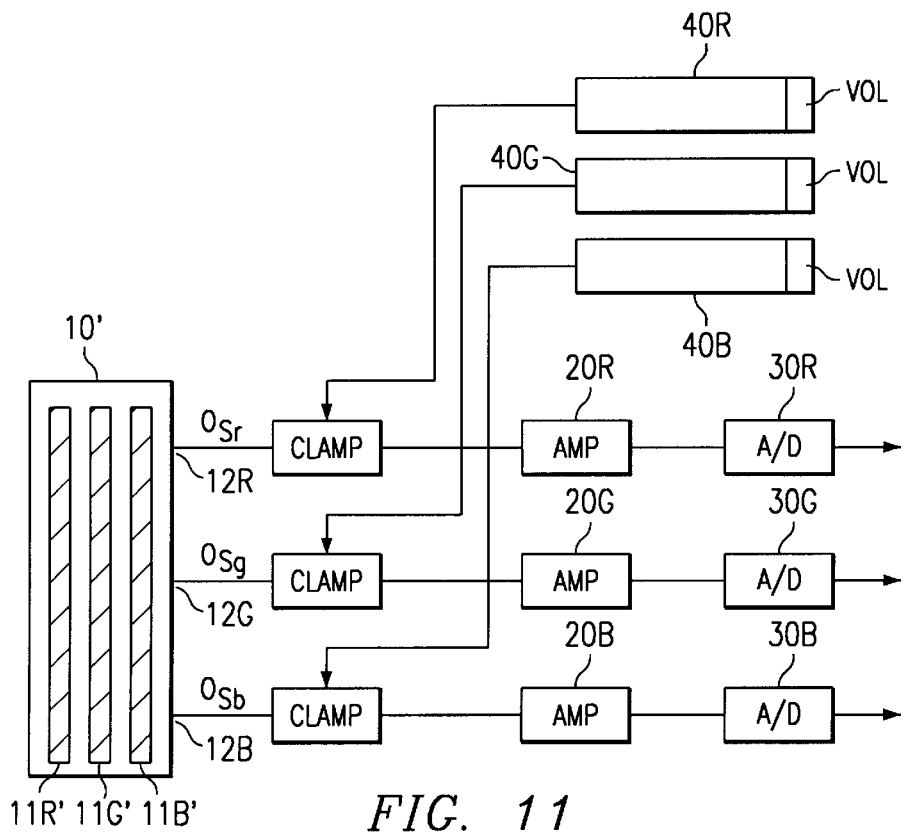
FIG. 11 is a block diagram showing the construction of a third embodiment of the image sensing device of the present invention.

For example, a clamp circuit may be provided as shown in FIG. 11, and a clamp voltage (bias voltage) applied to said clamp circuit may be controlled to regulate the DC component of the output signal. In this embodiment, each clamp circuit is part of the respective signal adjusting device. Furthermore, circuits may be provided to control the reference voltages (bias voltages) of amplification circuits 20R, 20G, 20B, such that the amount of offset of the signal voltage may be varied to regulate the DC component of the CCD output signal. These amplification circuits may be constructed by well known clamp circuits, and, therefore, specific description of their construction is omitted from this discussion.

Fourth Embodiment

In each of the previously described embodiments, image sensing devices have been described wherein output signals $O_{Sr}$, $O_{Sg}$, $O_{Sb}$, corresponding to each color R, G, B, are outputted in parallel from solid state image sensing section 10 used for color image sensing, and said output signals $O_{Sr}$, $O_{Sg}$, $O_{Sb}$ are processed by amplifiers 20R, 20G, 20B and A/D converters 30R, 30G, 30B provided independently for each color R, G, B. However, it is to be understood that the present invention is not limited to such image sensing devices.

Figure 12:
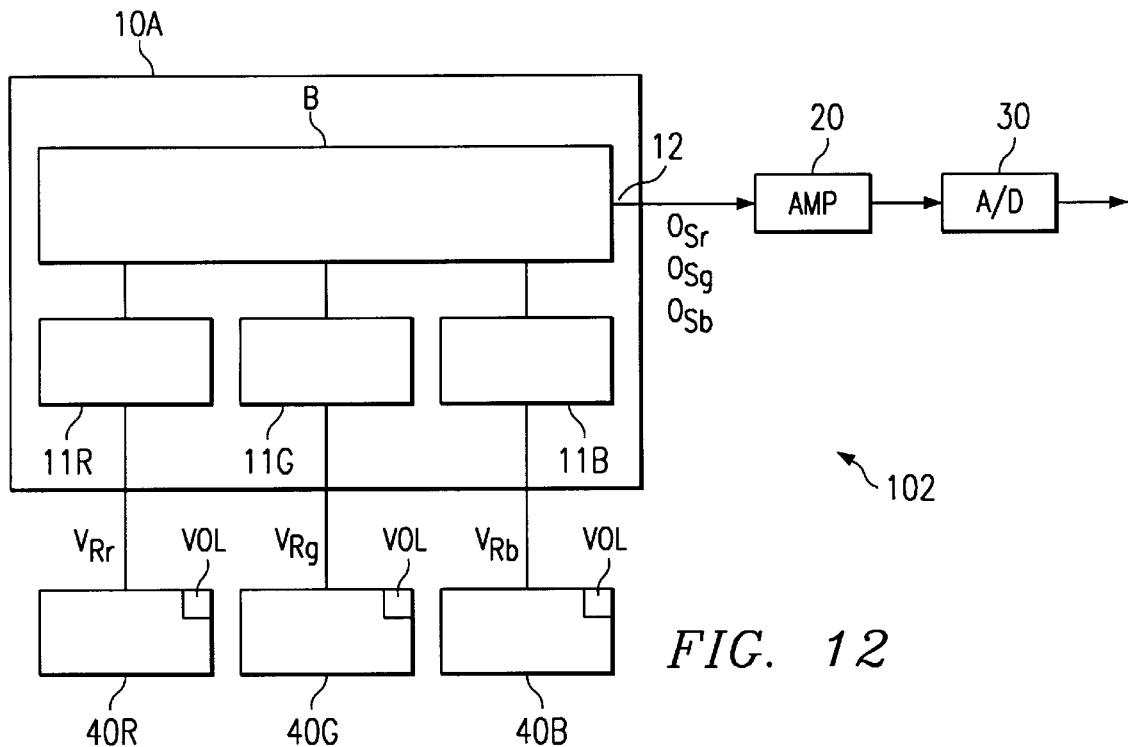
FIG. 12 is a block diagram showing the construction of a fourth embodiment of the image sensing device of the present invention.

For example, FIG. 12 shows image sensing device 102 of the fourth embodiment. In the drawing, parts comparable to those of previously described embodiments are designated by like reference numbers and are omitted from the present description. Image sensing device 102 serially outputs the color output signals $O_{Sr}$, $O_{Sg}$, $O_{Sb}$ from solid state image sensing section 10A, and sequentially processes said color output signals $O_{Sr}$, $O_{Sg}$, $O_{Sb}$ by amplifier 20 and A/D converter 30 which are used in common for each color.

Solid state image sensing section 10A is provided with photoreceptors 11R, 11G, 11B corresponding to each color R, G, B, and image sensing/transfer sections 13 (refer to FIG. 5) linearly arrayed in correspondence with said photoreceptors 11R, 11G, 11B. Output signals $O_{Sr}$, $O_{Sg}$, $O_{Sb}$ from solid state image sensing section 10A are stored temporarily in buffer B. The output signals $O_{Sr}$, $O_{Sg}$, $O_{Sb}$ are serially outputted in sequence from output pin 12. Amplifier 20 and A/D converter 30 sequentially process the serially outputted signals $O_{Sr}$, $O_{Sg}$, $O_{Sb}$.

In image sensing device 102 of the aforesaid construction, amplifier 20 and A/D converter 30 are provided in common for the various colors R, G, B, thereby simplifying construction.

Thus, the present invention is adaptable to image sensing devices which sequentially output R, G, B color signals from a solid state image sensing section. Although the device in FIG. 12 has been described in terms of a modification of the first embodiment, it is possible that the second and third embodiments may be similarly modified.

Fifth Embodiment

Figure 13:
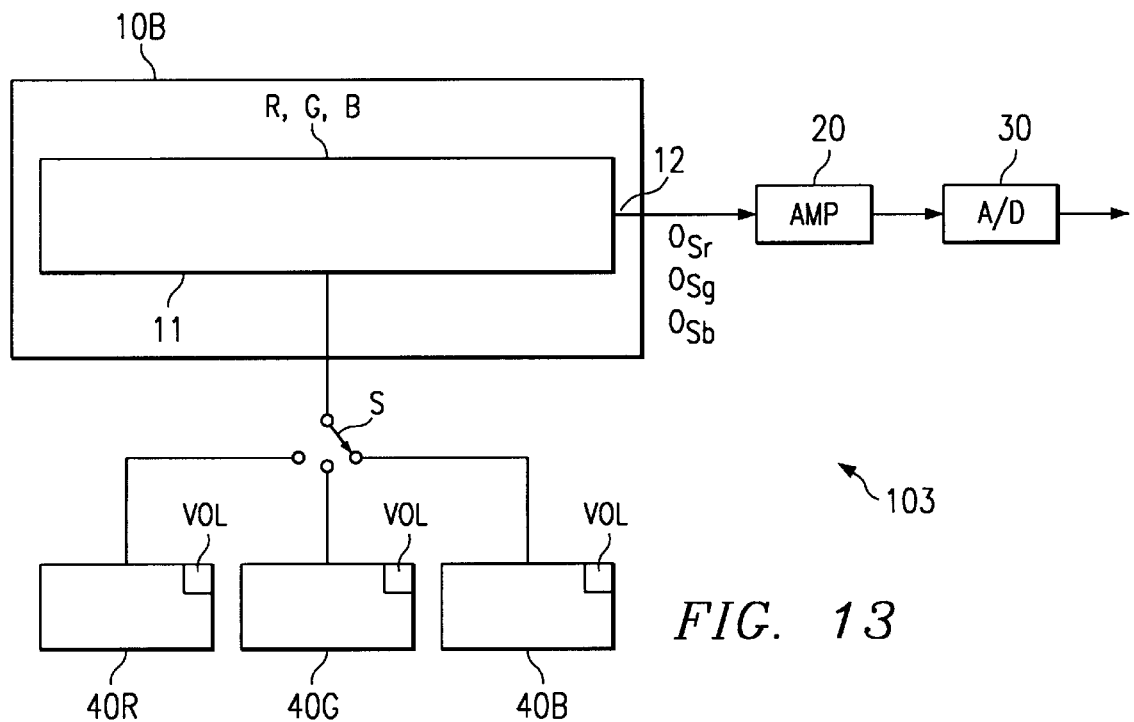
FIG. 13 is a block diagram showing the construction of a fifth embodiment of the image sensing device of the present invention.

FIG. 13 shows image sensing device 103 of the fifth embodiment. In the drawing, parts comparable to parts of previous embodiments are similarly designated by reference number, and further description is omitted. Image sensing device 103 serially produces color output signals $O_{Sr}$, $O_{Sg}$, $O_{Sb}$ by the image sensing cycles by solid state image sensing section 10B provided with a single array of image sensing/transfer section 13 by changing filters of red, green, and blue, and wherein the serially outputted color output signals $O_{Sr}$, $O_{Sg}$, $O_{Sb}$ are processed by amplifier 20 and A/D converter 30 provided commonly for each color. In this embodiment, switch S is changed synchronously with image sensing of each color, and reference voltages $V_{Rr}$, $V_{Rg}$, $V_{Rb}$, suitable for image sensing of each color are applied to second electrode 5 of image sensing/transfer section 13 (refer to FIG. 5)(reference voltages $V_{Rr}$, $V_{Rg}$, $V_{Rb}$ are mutually different). Specifically, the red filter is set, and switch S is positioned at the left position. Since switch S is positioned at the left position, reference voltage $V_{Rr}$ is outputted from voltage generation circuit 40R and is applied to second electrode 5 of image sensing/transfer section 13. In this state, image sensing of the red image is accomplished, and output signals $O_{Sr}$ are outputted from solid state image sensing section 10B and processed by amplifier 20 and A/D converter 30. Then, the filter is changed to the green filter, switch S is positioned at the center position, and image sensing of the green color image is accomplished, and the output signals $O_{Sg}$ are processed. Then, the filter is changed to the blue filter, switch S is changed to the right position, and image sensing of the blue color image is accomplished and output signals $O_{Sb}$ are processed.

In image sensing device 103 having the aforesaid construction, solid state image sensing section 10 uses only a single array of image sensing/transfer section 13, thereby simplifying construction of the device.

Thus, the present invention is adaptable for use in image sensing devices having a single array of image sensing/transfer elements. Although the embodiment of FIG. 13 has been described in terms of a modification of the first embodiment, it is to be noted that modifications of the second and third embodiments are similarly possible.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. An image sensing device comprising:
   a photoelectric signal generator which is sensitive to an incident light and which generates a photoelectric signal proportional to an intensity of the incident light;
   a converter which is connected with said photoelectric signal generator to receive the photoelectric signal and to generate a first analog signal which is logarithmically proportional to the photoelectric signal;
   a signal adjusting device which is connected with said converter to receive the first analog signal and to adjust a direct-current component of the first analog signal in order to generate a second analog signal; and an A/D converter which is connected with said signal adjusting device to generate a digital signal based on said second analog signal.

2. The image sensing device as claimed in claim 1, wherein said signal adjusting device includes a microcomputer.

3. The image sensing device as claimed in claim 1, wherein said signal adjusting device includes a volume control to permit manual changing of a quantity of adjusting of the direct-current component of the first analog signal by said signal adjusting device.

4. The image sensing device as claimed in claim 1, wherein said signal adjusting device includes a charge-coupled device.

5. The image sensing device as claimed in claim 1, wherein said converter includes a MOS transistor which operates in a subthreshold region.

6. An image sensing device comprising:

a photoelectric signal generator which is sensitive to an incident light and generates a photoelectric signal proportional to an intensity of the incident light;

a converter which is connected with said photoelectric signal generator to generate a first analog signal logarithmically proportional to the photoelectric signal;

a signal adjusting device which is connected with said converter for adjusting a direct-current component of the first analog signal to generate a second analog signal; and an A/D converter which is connected with said signal adjusting device to generate a digital signal based on the second analog signal generated by said signal adjusting device;

wherein said signal adjusting device includes a microcomputer; and wherein said microcomputer receives a digital signal generated by said A/D converter when a reference image is exposed to said photoelectric signal generator, and determines an adjustment quantity of the direct-current component of the first analog signal.

7. An image sensing device comprising:

a photoelectric signal generator which is sensitive to an incident light and generates a photoelectric signal proportional to an intensity of the incident light;

a converter which is connected with said photoelectric signal generator to generate a first analog signal logarithmically proportional to the photoelectric signal;

a signal adjusting device which is connected with said converter for adjusting a direct-current component of the first analog signal to generate a second analog signal; and an A/D converter which is connected with said signal adjusting device to generate a digital signal based on the second analog signal generated by said signal adjusting device;

wherein said signal adjusting device includes a charge-coupled device; and wherein said charge-coupled device has a gate to which a reference voltage is applied, and said reference voltage is variable to adjust the direct-current component of the first analog signal.

8. The image sensing device as claimed in claim 4, wherein said signal adjusting device includes a clamp circuit.

9. An image sensing device comprising:

a photoelectric signal generator which is sensitive to an incident light and generates a photoelectric signal proportional to an intensity of the incident light;

a converter which is connected with said photoelectric signal generator to receive the photoelectric signal, said converter generating a first analog signal which is logarithmically proportional to the photoelectric signal;

a charge-coupled device having a first gate and a second gate, wherein said first gate receives the first analog signal from said converter, said charge-coupled device generating a charge signal according to a difference between a potential of the first gate and a potential of the second gate;

a voltage applying device which is connected with said second gate to apply a voltage to said second gate, said voltage applying device including means for adjusting the voltage to be applied to the second gate; and an A/D converter which generates a digital signal based on the charge signal outputted from said charge-coupled device.

10. The image sensing device as claimed in claim 9, wherein said voltage applying device includes a microcomputer.

11. The image sensing device as claimed in claim 9, wherein said voltage applying device includes a volume control to permit manual changing of the voltage to be applied to the second gate.

12. The image sensing device as claimed in claim 9, wherein said converter including a MOS transistor which operates in a subthreshold region.

13. An image sensing device comprising:

a photoelectric signal generator which is sensitive to an incident light and generates a photoelectric signal proportional to an intensity of the incident light;

a converter which is connected with said photoelectric signal generator, said converter generating a first analog signal logarithmically proportional to the photoelectric signal;

a charge-coupled device having a first gate which receives the first analog signal from said converter and a second gate, said charge-coupled device generating a charge signal according to a difference between a potential of the first gate and a potential of the second gate;

a voltage applying device which is connected with said second gate to apply a voltage to said second gate, said voltage applying device including means for adjusting the voltage to be applied to the second gate; and an A/D converter which generates a digital signal based on the charge signal output from said charge-coupled device;

wherein said voltage applying device includes a microcomputer; and wherein said microprocessor receives a digital signal generated by said A/D converter when a reference image is exposed to the photoelectric signal generator, and determines the voltage to be applied to the second gate.

14. A method for generating a digital signal according to an incident light, comprising:

a first step of generating a photoelectric signal proportional to an intensity of the incident light;

a second step of generating a first analog signal which is logarithmically proportional to the photoelectric signal;

a third step of adjusting a direct-current component of the first analog signal at a predetermined adjusting quantity in order to generate a second analog signal;

a fourth step of converting the second analog signal into a digital signal;

a fifth step of changing the adjusting quantity of the direct-current component of the first analog signal utilized in said step of adjusting; and repeating said first, seconds third, and fourth steps.

15. A method for generating a digital signal according to an incident light, comprising:

first step of generating a photoelectric signal proportional to an intensity of light;

second step of generating a first analog signal logarithmically proportional to the photoelectric signal;

third step of adjusting a direct-current component of the first analog signal at a predetermined adjusting quantity to generate a second analog signal;

fourth step of converting the second analog signal into a digital signal; and fifth step of changing the adjusting quantity of the direct-current component of the first analog signal;

wherein the fifth step comprises:

sixth step of receiving the digital signal by a microcomputer; and seventh step of determining the adjusting quantity of the direct-current component of the first analog signal by said microcomputer.

16. An image sensing device comprising:

a plurality of photoelectric signal generators, each of which generates a photoelectric signal proportional to an intensity of incident light;

a plurality of converters which are connected with said photoelectric current generators, respectively, each of said converters generating a first analog signal logarithmically proportional to the photoelectric signal;

a signal adjusting device which is connected with said converters for adjusting direct-current components of the first analog signals generated by said converters to generate second analog signals; and a plurality of A/D converters each of which is connected with said signal adjusting device for converting each of the second analog signals into a digital signal;

wherein the signal adjusting device includes a microcomputer; and wherein said microcomputer receives each of the digital signals generated by the A/D converters when a reference image is exposed to the photoelectric signal generators, and determines each of adjustment quantities of the direct-current components of the first analog signals.

17. A image sensing device comprising:

a plurality of photoelectric signal generators, each of which generates a photoelectric signal proportional to an intensity of light incident on the respective photoelectric signal generator;

a plurality of converters, each of said converters being connected with a respective one of said photoelectric current generators to receive the photoelectric signal from the respective photoelectric current generator, each of said converters generating a first analog signal which is logarithmically proportional to the photoelectric signal received from the respective photoelectric current generator;

a signal adjusting device which is connected with said converters for receiving the first analog signals and for adjusting a direct-current component of each respective one of the first analog signals by an adjusting quantity in order to generate a corresponding second analog signal; and a plurality of A/D converters each of which is connected with said signal adjusting device for receiving each of the second analog signals and for converting each of the second analog signals into a digital signal.

18. The image sensing device as claimed in claim 17, wherein the signal adjusting device includes a microcomputer.

19. The image sensing device as claimed in claim 17, wherein said signal adjusting device includes a plurality of volume controls corresponding to the converters, respectively, to permit manual changing of each of the adjusting quantities of the direct-current components of the first analog signals.

20. The image sensing device as claimed in claim 17, wherein said signal adjusting device includes a plurality of charge-coupled devices, with each charge-coupled device being connected to receive a respective first analog signal.

21. The image sensing device as claimed in claim 20, wherein each of said charge-coupled devices has a gate to which a reference voltage is applied, and said reference voltage is variable to adjust the direct-current component of the respective first analog signal.

22. The image sensing device as claimed in claim 17, wherein each of said signal adjusting device includes a plurality of clamp circuits corresponding to the converts, respectively.

23. The image sensing device as claimed in claim 17, wherein each of said converters comprises MOS transistor which is operating in a subthreshold region.

24. An image sensing device in accordance with claim 17, further comprising a plurality of color filters, each of said color filters being associated with a respective one of said photoelectric signal generators so that the photoelectric signal generated by the respective photoelectric signal generator is representative of light which passes through the respective filter and is incident on the respective photoelectric signal generator.

25. An image sensing device in accordance with claim 24, wherein said signal adjusting device adjusts a direct-current component of each respective one of the first analog signals in order to generate a plurality of second analog signals having a desired white balance.

* * * * *

UNITED STATES PATENT AND TRADEMARK OFFICE
CERTIFICATE OF CORRECTION

PATENT NO.    : 6,201,617 B1
DATED         : March 13, 2001
INVENTOR(S)   : Yasushi Kusaka Page 1 of 1

It is certified that error appears in the above-identified patent and that said Letters Patent is hereby corrected as shown below:

Column 3,
Line 34, delete "MOST-FET", and insert -- MOS-FET --.
Line 35, delete "convert", and insert -- converter --.

Column 4,
Line 36, delete "MOST-FET", and insert -- MOS-FET --.
Line 38, delete "regulator", and insert -- regulated --.
Line 66, delete "convert", and insert -- converter --.

Column 9,
Line 11, delete "adjusting", and insert -- adjustment --.

Column 11,
Line 6, delete "seconds", and insert -- second, --.
Line 33, delete "current", and insert -- signal --.
Line 52, delete "A", and insert -- An --.

Column 12,
Line 1, delete "current", and insert -- signal --.
Line 2, delete "current", and insert -- signal --.
Line 6, delete "current", and insert -- signal --.
Line 38, delete "each of".
Line 39, delete "converts", and insert -- converters --.
Line 42, after "comprises", insert -- a --.

Signed and Sealed this

Twenty-seventh Day of November, 2001

Attest:

NICHOLAS P. GODICI
Attesting Officer    Acting Director of the United States Patent and Trademark Office